United States Patent
Kita et al.

(10) Patent No.: US 8,843,687 B2
(45) Date of Patent: Sep. 23, 2014

(54) SEMICONDUCTOR DEVICE CONTROLLING OUTBOUND AND INBOUND PATH SWITCHING SECTIONS BASED ON A SETTING STATE AND CONTROLLING METHOD THEREOF

(75) Inventors: Hisae Kita, Kanagawa (JP); Tatsuhiro Suzumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 211 days.

(21) Appl. No.: 13/472,655

(22) Filed: May 16, 2012

(65) Prior Publication Data

US 2013/0151742 A1    Jun. 13, 2013

(30) Foreign Application Priority Data

Dec. 12, 2011 (JP) ................................ 2011-271395

(51) Int. Cl.
*G06F 13/00* (2006.01)

(52) U.S. Cl.
USPC .......................................... 710/316; 710/110

(58) Field of Classification Search
CPC  G06F 13/4291; G06F 13/4022; G06F 3/0689
USPC ....................... 710/104–110, 36–39, 306–317
See application file for complete search history.

(56) References Cited

U.S. PATENT DOCUMENTS

| | | | |
|---|---|---|---|
| 7,069,363 B1 * | 6/2006 | Worrell ........................ | 710/110 |
| 7,296,109 B1 | 11/2007 | Zhang et al. | |
| 7,376,771 B1 * | 5/2008 | Brabant et al. ................ | 710/63 |
| 7,461,187 B2 * | 12/2008 | Morishita et al. .............. | 710/60 |
| 7,581,049 B2 * | 8/2009 | Tanabe ......................... | 710/110 |
| 7,809,861 B1 * | 10/2010 | Pritchard et al. ................ | 710/9 |
| 8,171,186 B1 * | 5/2012 | Karguth et al. ................. | 710/35 |
| 2007/0156937 A1 * | 7/2007 | Seong et al. ................... | 710/110 |
| 2008/0034139 A1 * | 2/2008 | Han et al. ...................... | 710/110 |
| 2009/0113097 A1 * | 4/2009 | Drerup et al. .................. | 710/110 |

FOREIGN PATENT DOCUMENTS

| JP | 11-110342 | 4/1999 |
|---|---|---|
| JP | 2008-287557 | 11/2008 |

* cited by examiner

*Primary Examiner* — Raymond Phan

(74) *Attorney, Agent, or Firm* — Oblon, Spivak, McClelland, Maier & Neustadt, L.L.P.

(57) ABSTRACT

According to one embodiment, a semiconductor device includes a storing section that stores a setting state that is one of a first connecting state in which another end of a first outbound system bus is connected to an outbound output terminal and another end of a first inbound system bus is connected to an inbound output terminal, and a second connecting state in which another end of a second outbound system bus is connected to the outbound output terminal and another end of a second inbound system bus is connected to the inbound output terminal; and a control section that controls an outbound path switching section and an inbound path switching section based on the setting state so as to assume one of the first connecting state and the second connecting state.

23 Claims, 11 Drawing Sheets

SEMICONDUCTOR DEVICE CONTROLLING OUTBOUND AND INBOUND PATH SWITCHING SECTIONS BASED ON A SETTING STATE AND CONTROLLING METHOD THEREOF

CROSS-REFERENCE TO RELATED APPLICATIONS

This application is based upon and claims the benefit of priority from Japanese Patent Application No. 2011-271395, filed on Dec. 12, 2011; the entire contents of which are incorporated herein by reference.

FIELD

Embodiments described herein relate generally to a semiconductor device and a controlling method thereof.

BACKGROUND

In the conventional art, when a timing path delay in a system bus is violated with timing constraints, a timing closure thereof is made by changing a hardware design of the system bus.

However, if the hardware design of the system bus is changed for the modification of the timing path delay, an iteration occurs between the hardware design and an implementation, and there had been a problem of increases in time and cost required before converging the timing path delay into a predetermined timing range.

DETAILED DESCRIPTION

According to one embodiment, a semiconductor device includes a bus circuit that includes: a first outbound system bus having one end connected to an outbound input terminal, a second outbound system bus having one end connected to the outbound input terminal, an outbound data retaining section arranged on the second outbound system bus, an outbound path switching section that connects one of another end of the first outbound system bus and another end of the second outbound system bus to an outbound output terminal, a first inbound system bus having one end connected to an inbound input terminal, a second inbound system bus having one end connected to the inbound input terminal, an inbound data retaining section arranged on the second inbound system bus, and an inbound path switching section that connects one of another end of the first inbound system bus and another end of the second inbound system bus to an inbound output terminal. According to the embodiment, a semiconductor device includes a storing section that stores a setting state that is one of a first connecting state in which the another end of the first outbound system bus is connected to the outbound output terminal and the another end of the first inbound system bus is connected to the inbound output terminal, and a second connecting state in which the another end of the second outbound system bus is connected to the outbound output terminal and the another end of the second inbound system bus is connected to the inbound output terminal; and a control section that controls the outbound path switching section and the inbound path switching section based on the setting state so as to assume one of the first connecting state and the second connecting state.

Hereinbelow, a semiconductor device and a controlling method thereof of embodiments will be explained in detail with reference to the drawings. Note that, the present invention is not limited by these embodiments.

First Embodiment

Figure 1:
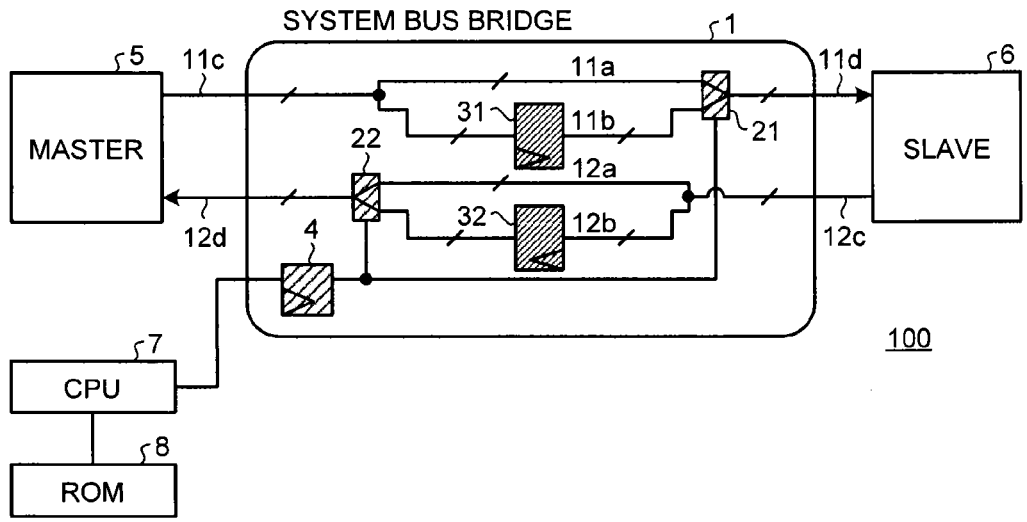
FIG. 1 is a diagram showing a configuration of a semiconductor device of a first embodiment.

FIG. 1 is a diagram showing a configuration of a semiconductor device 100 of a first embodiment. The semiconductor device 100 includes a system bus bridge circuit 1, a CPU 7, and a ROM 8. Further, a master 5 is connected to an outbound input terminal 11c and an inbound output terminal 12d of the system bus bridge circuit 1, and a slave 6 is connected to an outbound output terminal 11d and an inbound input terminal 12c of the system bus bridge circuit 1. That is, the master 5 and the slave 6 are connected on a one-to-one basis through the system bus bridge circuit 1. The master 5, the slave 6, and the system bus bridge circuit 1 are synchronized by a same clock signal, and the master 5 and the slave 6 perform transmission of signals at a predetermined cycle (operating frequency) through the system bus bridge circuit 1. Control signals such as a data signal, an address signal, a request signal and the like run concurrently in parallel in the outbound input terminal 11c, the outbound output terminal 11d, the inbound input terminal 12c, and the inbound output terminal 12d through system buses.

One end of a system bus 11a and one end of a system bus 11b are connected to the outbound input terminal 11c of the system bus bridge circuit 1. At a midway portion of the system bus 11b, a data retaining circuit 31 configured of a flip-flop (register) and the like is provided. Another end of the system bus 11a and another end of the system bus 11b are respectively connected to a system bus switching function circuit 21. The system bus switching function circuit 21 is controlled by a system bus switching register control circuit 4, and switches between a first connecting state in which the other end of the system bus 11a is connected to the outbound output terminal 11d, and a second connecting state in which the other end of the system bus 11b is connected to the outbound output terminal 11d.

One end of a system bus 12a and one end of a system bus 12b are connected to the inbound input terminal 12c of the system bus bridge circuit 1. At a midway portion of the system bus 12b, a data retaining circuit 32 configured of a flip-flop (register) and the like is provided. Another end of the system bus 12a and another end of the system bus 12b are respectively connected to a system bus switching function circuit 22. The system bus switching function circuit 22 is controlled by the system bus switching register control circuit 4, and switches between a first connecting state in which the other end of the system bus 12a is connected to the inbound output terminal 12d, and a second connecting state in which the other end of the system bus 12b is connected to the inbound output terminal 12d.

Accordingly, for example, the system bus 11a and the system bus 11b are control signal lines and data signal lines such as an address signal line and a request signal line, and the system bus 12a and the system bus 12b are data signal lines such as a response signal line and a control signal line.

One of the above-described first connecting state and second connecting state is stored beforehand as a setting state in the ROM 8 that is the storing section. The CPU 7 switches the system bus switching function circuits 21 and 22 by using the system bus switching register control circuit 4 based on the setting state in the ROM 8. That is, switching is performed between the first connecting state in which the other end of the system bus 11a is connected to the outbound output terminal 11d and the other end of the system bus 12a is connected to the inbound output terminal 12d, and the second connecting state in which the other end of the system bus 11b is connected to the outbound output terminal 11d and the other end of the system bus 12b is connected to the inbound output terminal 12d.

In the semiconductor device 100 of FIG. 1 including the system bus bridge circuit 1, paths using the system buses 11a and 12a are selected if a timing path delay (a sum of a wiring delay and a cell delay) of the system buses 11a and 12a is within a predetermined timing range, and paths using the system buses 11b and 12b which run through the data retaining circuits 31 and 32 are selected if the timing path delay is longer than the predetermined timing range. Due to this, a timing closure to converge the timing path delay to be within the predetermined timing range becomes possible.

Figure 2:
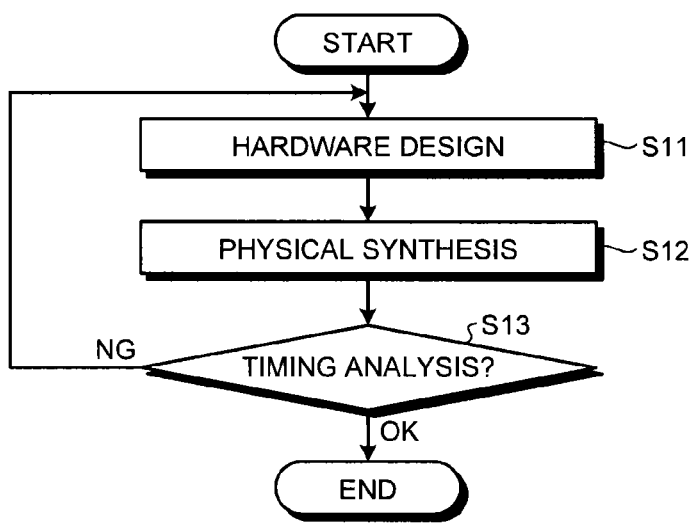
FIG. 2 is a diagram showing a conventional SoC design flow.
Figure 4:
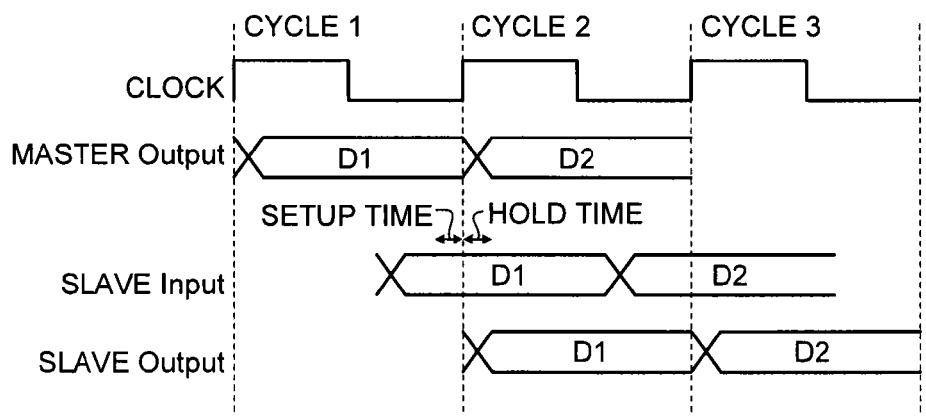
FIG. 4 is a timing chart showing a case of inputting data to a slave in a permissible duration of time in the first embodiment.
Figure 5:
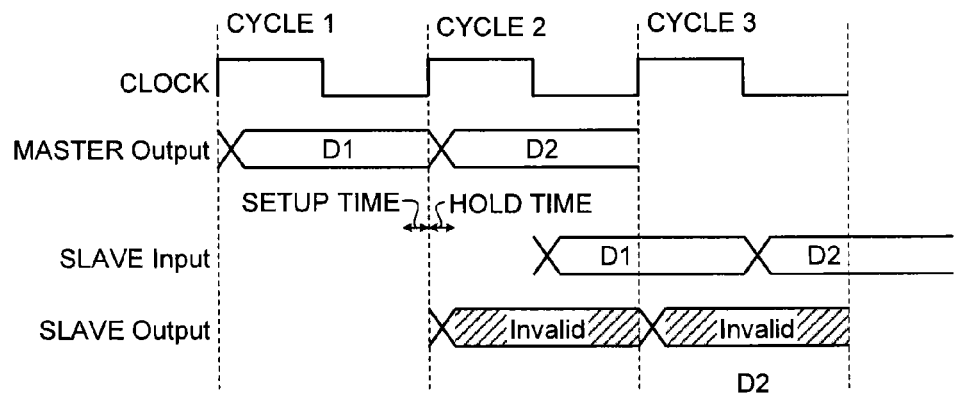
FIG. 5 is a timing chart showing a case of not inputting data to the slave in the permissible duration of time in the first embodiment.

As shown in FIG. 2, a conventional System on Chip (SoC) design flow proceeds through a hardware design (step S11), a physical synthesis (step S12), and a timing analysis (step S13). In the timing analysis (step S13), as shown in FIG. 4, an analysis is performed on whether data outputted from the master (D1) in cycle 1 is inputted to the slave during a permissible duration of time including a timing of a rising edge of cycle 2 or not (FIG. 5). The permissible duration of time is a duration of time in which a setup time before the edge and a hold time after the edge are combined. FIG. 4 shows a case where the data (D1) is inputted to the slave during the permissible duration of time including the rising edge of cycle 2 (step S13: OK), and FIG. 5 shows a case where the data (D1) does not arrive at the slave during the permissible duration of time due to the timing path delay (step S13: NG). Although the process ends in a case where the data arrives within one cycle (step S13: OK), in a case where the data (D1) does not arrive at the slave during the permissible duration of time (step S13: NG), conventionally, the process has to return to the hardware design (step S11) to modify the design, and this takes time and cost.

Figure 3:
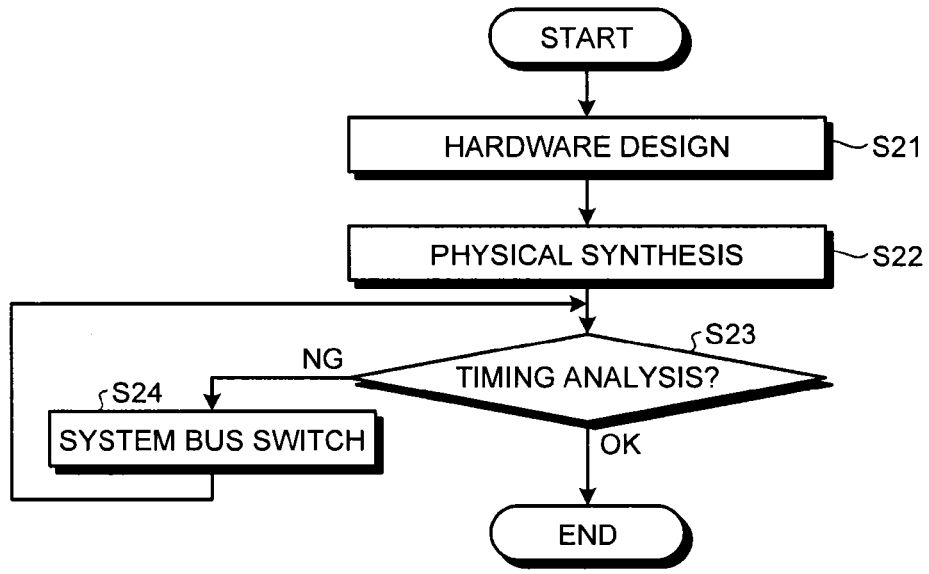
FIG. 3 is a diagram showing a SoC design flow of the first embodiment.

In the present embodiment, by using the system bus bridge circuit 1, the SoC design flow can be simplified and shortened as shown in FIG. 3. That is, the process proceeds to a hardware design (step S21), a physical synthesis (step S22), and in a timing analysis (step S23), the timing analysis is performed under the first connecting state in which the other end of the system bus 11a is connected to the outbound output terminal 11d and the other end of the system bus 12a is connected to the inbound output terminal 12d.

Figure 6:
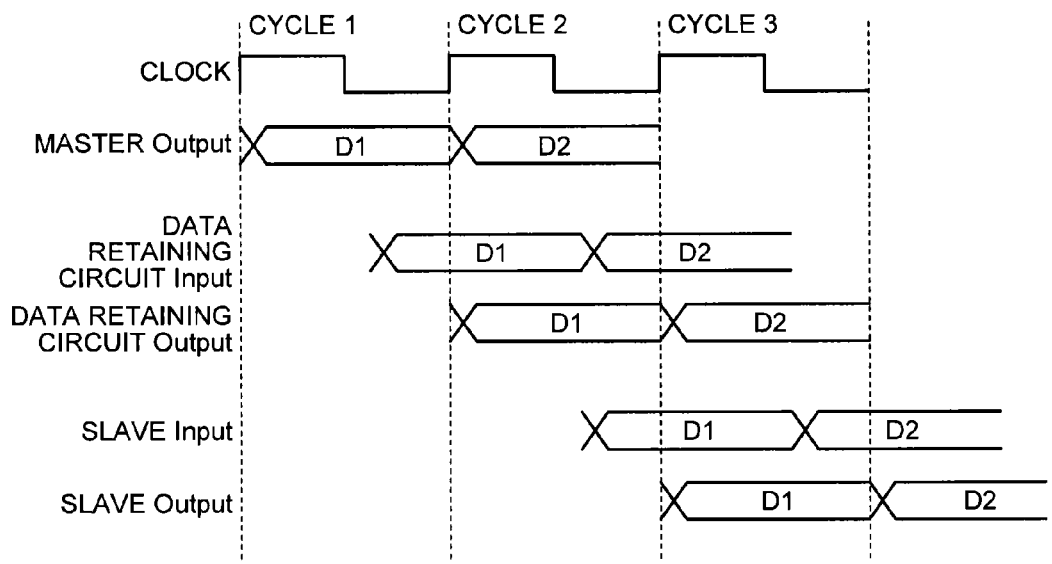
FIG. 6 is a timing chart in a case of performing a system bus switching in the first embodiment.

As shown in FIG. 4, as a result of this, in a case where the data (D1) outputted from the master 5 in cycle 1 is inputted to the slave 6 during the permissible duration of time including the timing of the rising edge of cycle 2 (step S23: OK), the first connecting state is maintained. However, in a case where the data (D1) does not arrive at the slave 6 during the permissible duration of time including the timing of the rising edge of cycle 2 due to the timing path delay (step S23: NG), the system buses are switched (step S24), and the second connecting state in which the other end of the system bus 11b is connected to the outbound output terminal 11d and the other end of the system bus 12b is connected to the inbound output terminal 12d is assumed. As shown in FIG. 6, as a result of this, the data (D1) outputted from the master 5 in cycle 1 is inputted to the data retaining circuit 31 during the permissible duration of time including the timing of the rising edge of cycle 2, and is outputted from the data retaining circuit 31 in cycle 2. The data (D1) outputted from the data retaining circuit 31 in cycle 2 arrives at the slave 6 during a permissible duration of time including a timing of a rising edge of cycle 3, and thereby data transfer by one cycle between configurational elements under clock-synchronization becomes possible.

Figure 7:
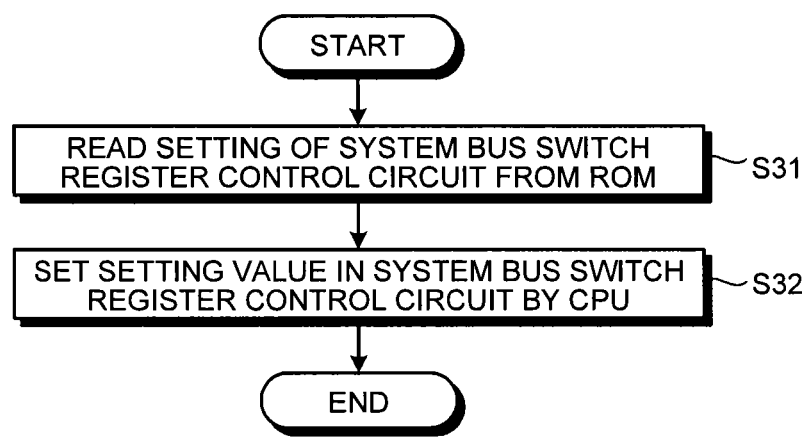
FIG. 7 is a diagram showing a sequence of the system bus switching in the first embodiment.

Based on the result of the timing analysis (step S23), an optimal connecting state for the system buses (the above-described first connecting state or second connecting state) is written in the ROM 8 as a firmware describing a setting of the system bus switching register control circuit 4. Accordingly, the switching of the system buses in step S24 is depicted specifically as a sequence shown in FIG. 7. Firstly, the written firmware is read from the ROM 8 by the CPU 7 as the setting of the system bus switching register control circuit 4 (step S31). The CPU 7 sets the read-out setting to the system bus switching register control circuit 4 (step S32). Due to this, the system bus switching register control circuit 4 switches the system bus switching function circuits 21 and 22, and thereby switches the system buses.

Figure 15:
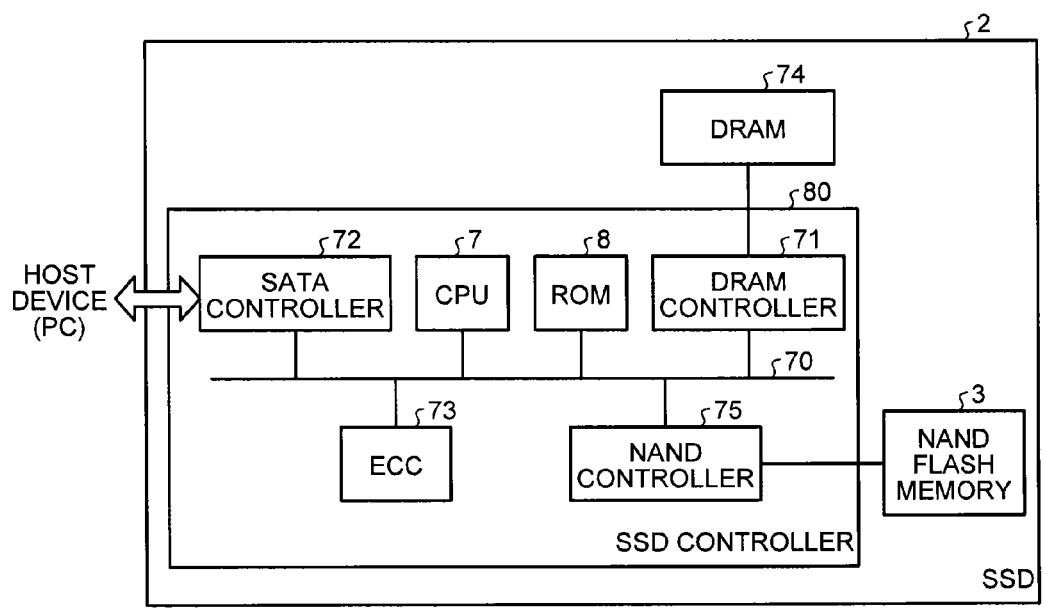
FIG. 15 is a block diagram showing a configurational example of an SSD of the first embodiment.

The system bus bridge circuit 1 of the present embodiment may for example be used in a Solid State Drive (SSD) as shown in FIG. 15. FIG. 15 is a block diagram showing an example of an SSD configuration. As shown in the drawing, an SSD is connected to a host device such as a personal computer by a communication standard such as a SATA interface, and functions as an external memory for the host device. The SSD 2 includes a NAND flash memory 3 that is a non-volatile memory storing data, of which writing has been requested from the host device, an SSD controller 80 that is to be a transfer controller that controls the data transfer between the host device and the NAND flash memory 3, and a DRAM 74 that is a volatile memory used as a buffer region for the data transfer by the SSD controller 80. Note that the DRAM 74 is not essential, and a volatile memory such as a SRAM (not shown) provided inside the SSD controller 80 may be used.

The SSD controller 80 includes a system bus 70. A CPU 7 that controls an entirety of the SSD controller 80, a ROM 8 in which a boot-up program that boots up various management programs (firmwares) stored in the NAND flash memory 3 is stored, a DRAM controller 71 that performs read/write control of the DRAM 74, a SATA controller (SATA interface controller) 72 that transmits data to and from the host device through the SATA interface, and an Error Correction Circuit (ECC) 73, and a NAND controller 75 that controls the NAND flash memory 3 are connected to the system bus 70.

Any two of these components connected to the system bus 70 of FIG. 15 can be selected as the master 5 and the slave 6 of FIG. 1. For example, the CPU 7 of FIG. 15 may be the master 5 of FIG. 1 and the NAND controller 75 of FIG. 15 may be the slave 6 of FIG. 1, where the system bus bridge circuit 1 of FIG. 1 may function as the system bus 70 of FIG. 15. The system bus 70 shown in FIG. 15 is abstracted, and in actuality, the two components connected to the system bus 70 are physically connected by the system bus bridge circuit 1 of FIG. 1 and the like so that the master 5 and the slave 6 are on the one-to-one basis. No matter which components are chosen as the master 5 and the slave 6, sequences of the switching of the system bus performed by the CPU 7 and the ROM 8 of FIG. 1 are performed by the CPU 7 and the ROM 8 of FIG. 15.

Figure 8:
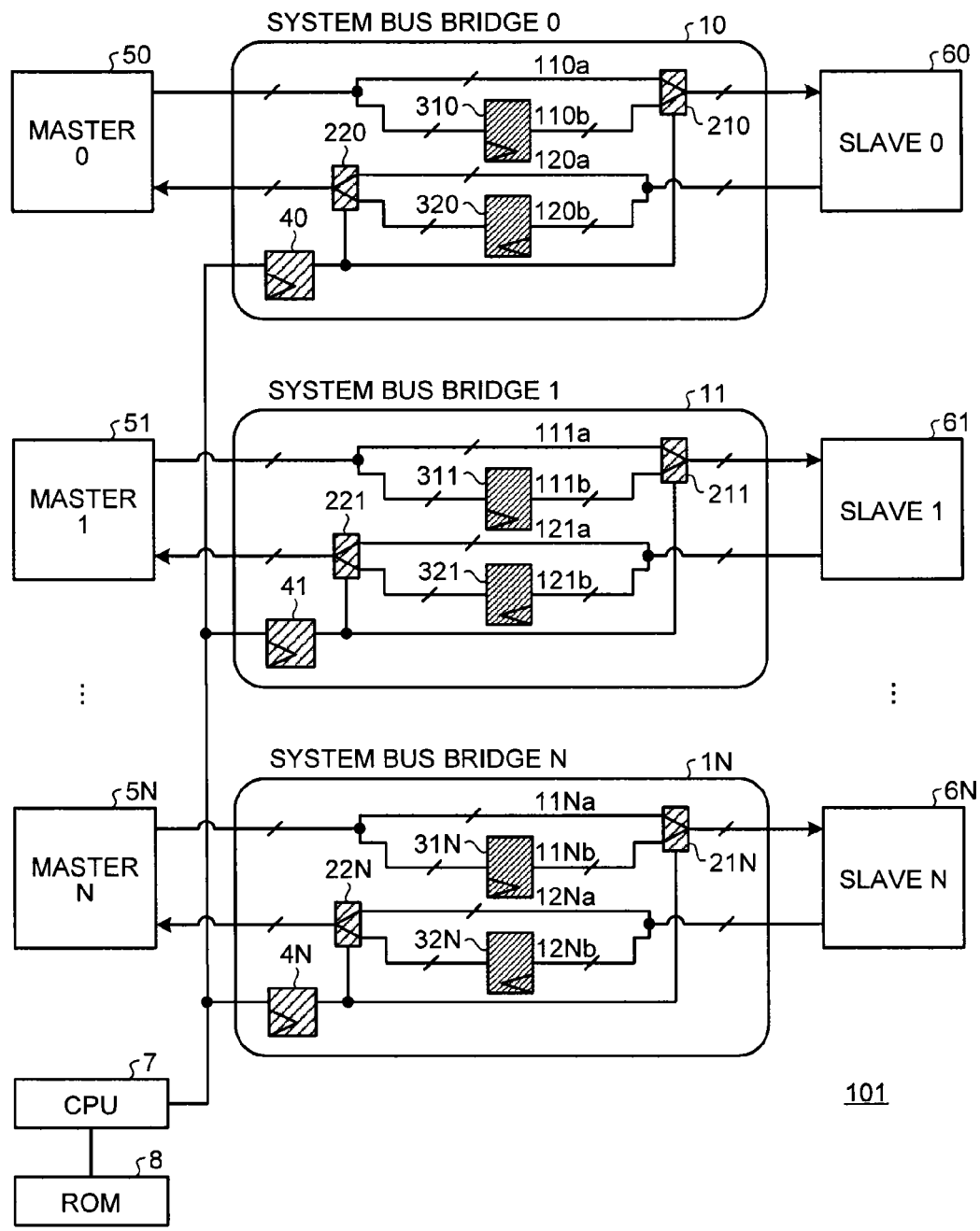
FIG. 8 is a diagram showing another configuration of the semiconductor device of the first embodiment.

Accordingly, the configuration of the semiconductor device 100 shown in FIG. 1 can be expanded to a semiconductor device 101, as shown in FIG. 8, configured of a plurality of sets of masters and slaves including a plurality of masters 50, 51, . . . , 5N and a plurality of slaves 60, 61, . . . , 6N with a plurality of system bus bridge circuits 0, 1, . . . , N being intervened.

As explained above, in the present embodiment, in a system in which the master and the slave are connected by the system bus configured to transmit the data signal, control signal and the like, by switching to the path that runs through the data retaining circuit in the case where the timing path delay of the system bus is longer than the predetermined cycle, the system bus bridge circuit that is to be at the timing path delay within a predetermined cycle is used. Due to this, a hardware design iteration of the system bus can be reduced, and a Turn Around Time (TAT) of the timing closure can be shortened.

Second Embodiment

Figure 9:
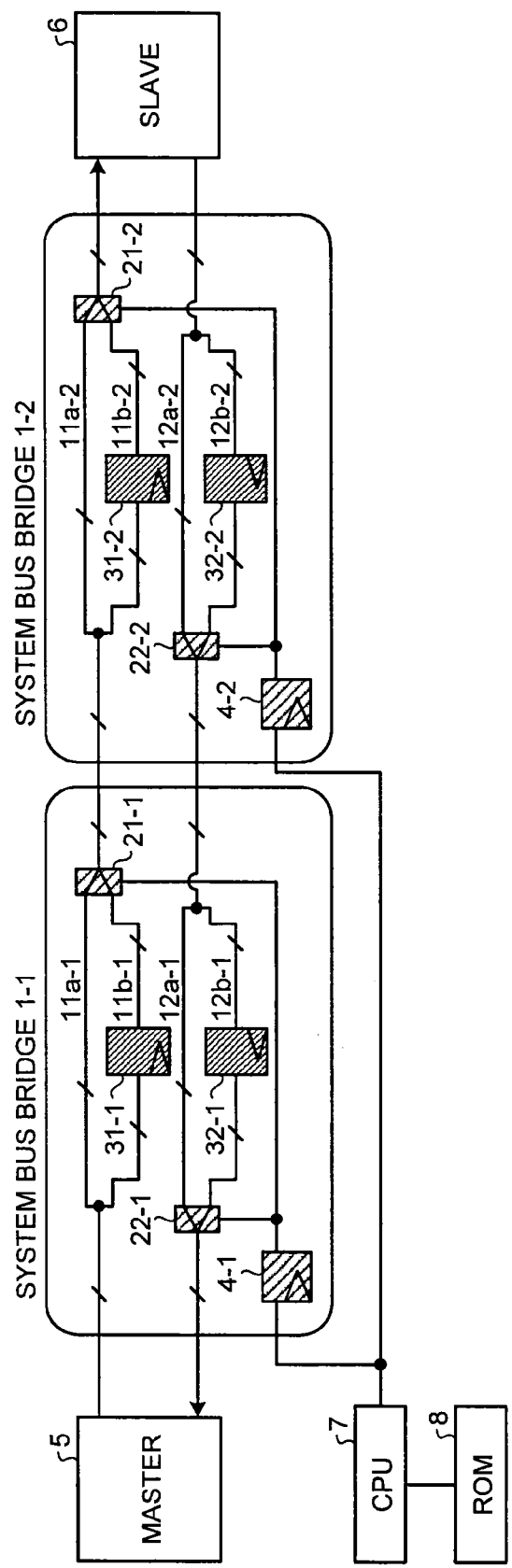
FIG. 9 is a diagram showing a configuration of a semiconductor device of a second embodiment.
Figure 10:
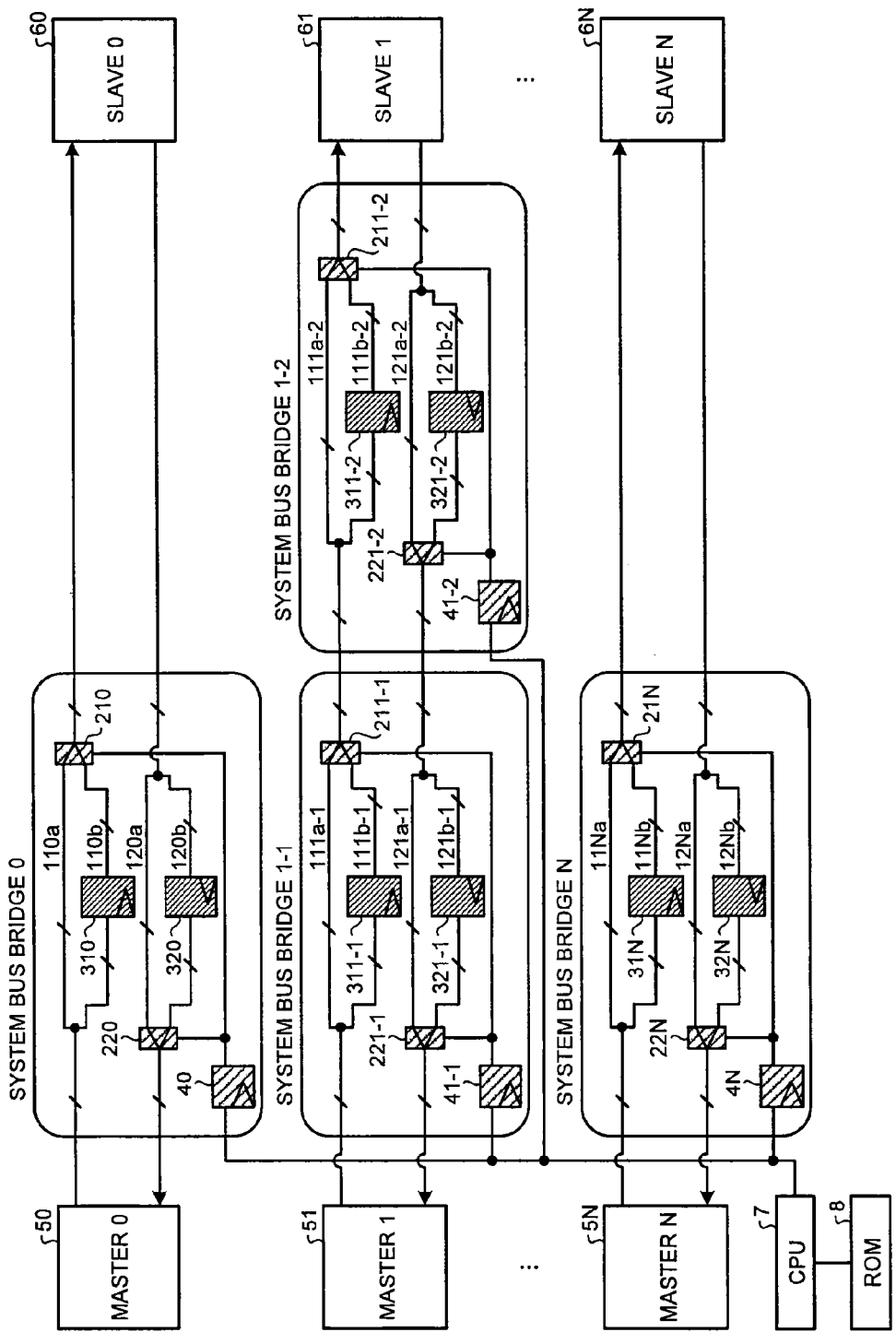
FIG. 10 is a diagram showing another configuration of the semiconductor device of the second embodiment.

In a case where the timing path delay is larger than one cycle and at or smaller than two cycles of the operating frequency, only one data retaining circuit is necessary on the system bus as explained in the first embodiment, however, an operation thereof becomes impossible in a case of the timing path delay being larger than two cycles. In this case, a plurality of the system bus bridge shown in the first embodiment may be connected serially, and as shown in FIG. 9, system bus bridge circuits 1-1 and 1-2 may be provided. In the configuration shown in FIG. 9, in the case where the timing path delay between the master 5 and the slave 6 is larger than one cycle and at or smaller than two cycles of the operating frequency, outbound and inbound paths of the system bus having the data retaining circuit may be selected from one of the system bus bridge circuits 1-1 and 1-2. In a case where the timing path delay is larger than two cycles and at or smaller than three cycles of the operating frequency, the outbound and inbound paths of the system bus having the data retaining circuit may be selected from both of the system bus bridge circuits 1-1 and 1-2. In a case where the timing path delay is larger than three cycles of the operating frequency, a number of the serial connection of the system bus bridge circuit may further be increased. An example of the configuration configured of a plurality of sets of masters and slaves including the master 51 and slave 61 connected through the serially connected system bus bridge circuits is shown in FIG. 10.

Figure 11:
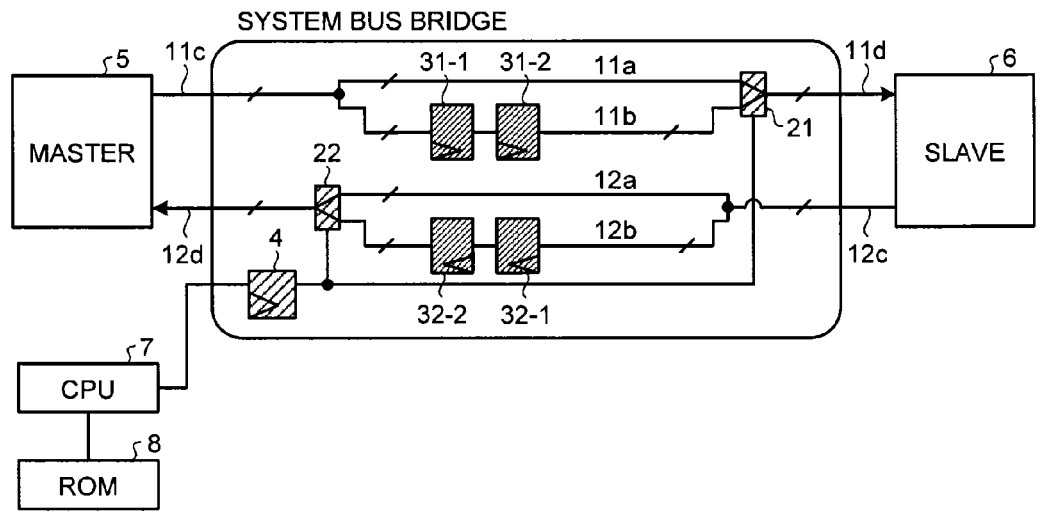
FIG. 11 is a diagram showing yet another configuration of the semiconductor device of the second embodiment.

Further, for the timing path delay larger than two cycles, as shown in FIG. 11, a configuration capable of switching the system bus may be provided by a configuration in which two data retaining circuits 31-1 and 31-2 are serially arranged at a midway portion of the system bus 11b included in one of the system bus bridge circuits, and two data retaining circuits 32-1 and 32-2 are serially arranged at a midway portion of the inbound system bus 12b.

Third Embodiment

As for the data transmission between the master and the slave, there is a case of a single transmission that receives a receipt confirmation (ACK) for each data transmission, and a case of a burst transmission that consecutively transmits data of consecutive addresses. If the burst transmission is performed in the system bus bridge circuit 1 as had been shown in the first embodiment, a decrease in a throughput occurs. In order to suppress this, in the present embodiment, as shown in a semiconductor device 200 of FIG. 12, an address increment circuit 9 having an address lookahead function is further provided on the system bus 11b of the data retaining circuit 31 on the slave 6 side in the system bus bridge circuit 1. The system bus bridge circuit 1 is configured into a pipeline by serially connecting one or more data retaining circuits as above-mentioned. The address increment circuit 9 is adapted to the pipeline configuration by inputting a number of the serial connection of the data retaining circuits as a pipeline number signal.

An example of an operation of the semiconductor device 200 of FIG. 12 will be explained with reference to a signal timing chart shown in FIG. 13. Here, by the presence of the timing path delay, it is assumed that the system bus 11b and the system bus 12b are selected.

Figure 13:
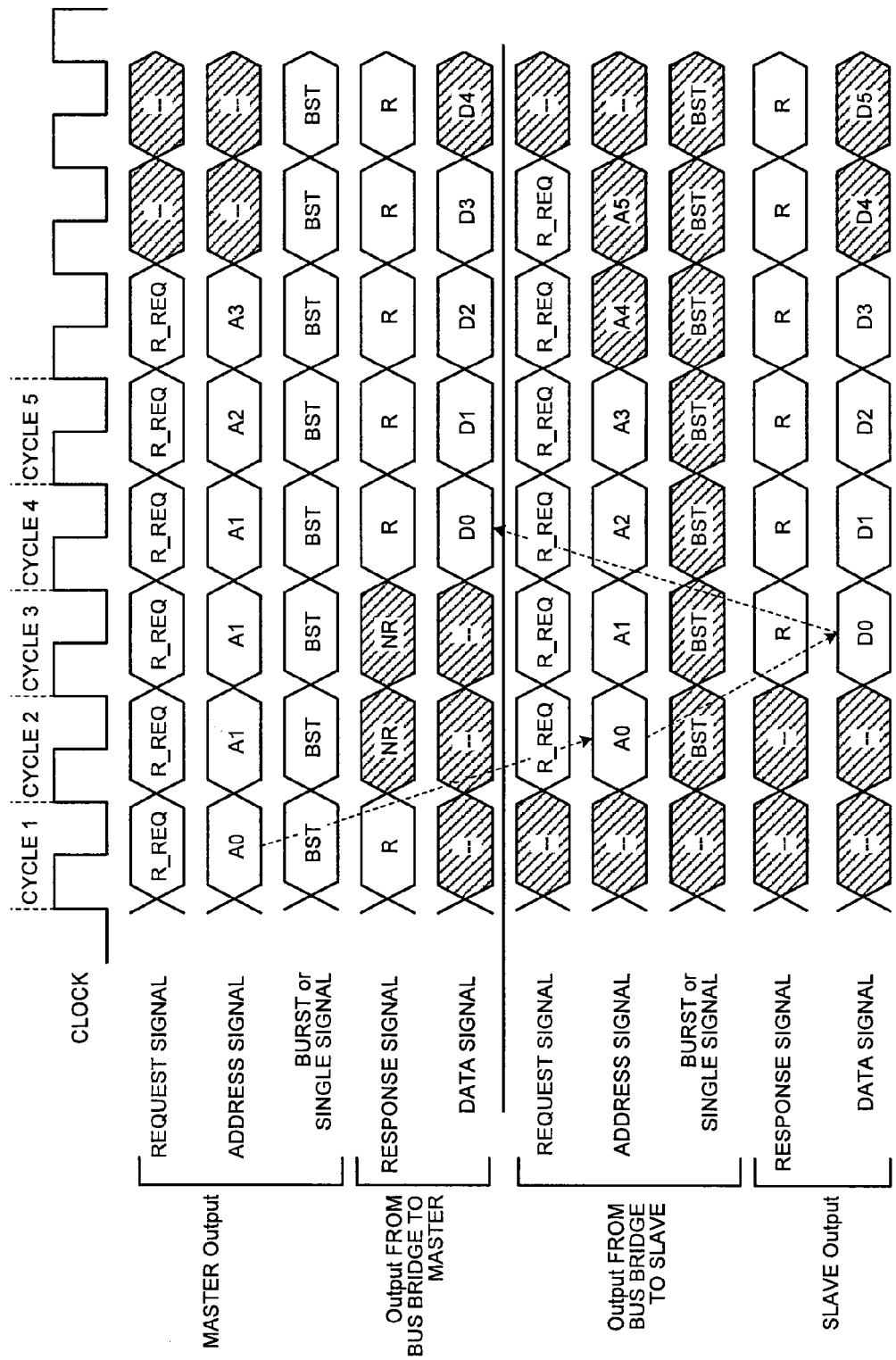
FIG. 13 is a timing chart that explains an operation of the semiconductor device of the third embodiment.

From the master 5 to the system bus bridge circuit 1, a "request signal", "address signal", and "burst or single signal" of a "master output" in FIG. 13 are sent to the outbound input terminal 11c. A "R_REQ" indicating a read request (read request) is sent as the "request signal", and a read address is sent as the "address signal". As the "burst or single signal", although the data transmission format is indicated as either the burst transmission or the single transmission, in this example, a "BST" indicating that the read request is a burst reading is sent. From the system bus bridge circuit 1 to the master 5, a "response signal" and "data signal" of an "output from bus bridge to master" in FIG. 13 are sent to the inbound output terminal 12d. In this example, although "A0" of the "address signal" of the "master output" is sent in cycle 1, in the next cycle 2, data "D0" corresponding to the address "A0" is not sent to the "data signal" of the "output from bus bridge to master", and "NR" (No Response) is sent to the "response signal".

From the system bus bridge circuit 1 to the slave 6, a "request signal", "address signal", and "burst or single signal" of an "output from bus bridge to slave" in FIG. 13 are sent to the outbound output terminal 11d. These signals are outputs configured of outputs of the data retaining circuit 31 having been through the address increment circuit 9. Due to having been through the data retaining circuit 31, a signal sequence that is identical to the "request signal", and "burst or single signal" of the "master output" are sent from the "request signal", and "burst or single signal" after cycle 2 by a delay in timing of one cycle. However, as for the "address signal", in subsequent cycles after having sent "A0" in cycle 2, the address is incremented by the address lookahead function, and address lookahead instructions are automatically sent to the slave 6, such as "A1", "A2", "A3" and so on.

In response to this, the slave 6 sends a "response signal" and "data signal" of a "slave output" in FIG. 13 to the system bus bridge circuit 1 from the inbound input terminal 12c. Specifically, the "response signal" keeps sending "R" (Response) from cycle 3, and concurrently the "data signal" consecutively sends data as requested such as "D0", "D1", "D2", "D3", . . . from cycle 3. The "response signal" and the "data signal" of the "slave output" are sent as they are as the "response signal" and "data signal" of the "output from bus bridge to master" from cycle 4 that is the subsequent cycle through the data retaining circuit 32. The address increment circuit 9 may perform the address increment only during the burst transmission shown in this example, or may alternatively perform the address increment automatically regardless of the burst transmission or the single transmission.

As explained above, it becomes possible to perform a speculative address lookahead in the burst transmission after having performed the timing disclosure of the timing path delay by the system bus bridge circuit 1 of the semiconductor device 200.

Figure 12:
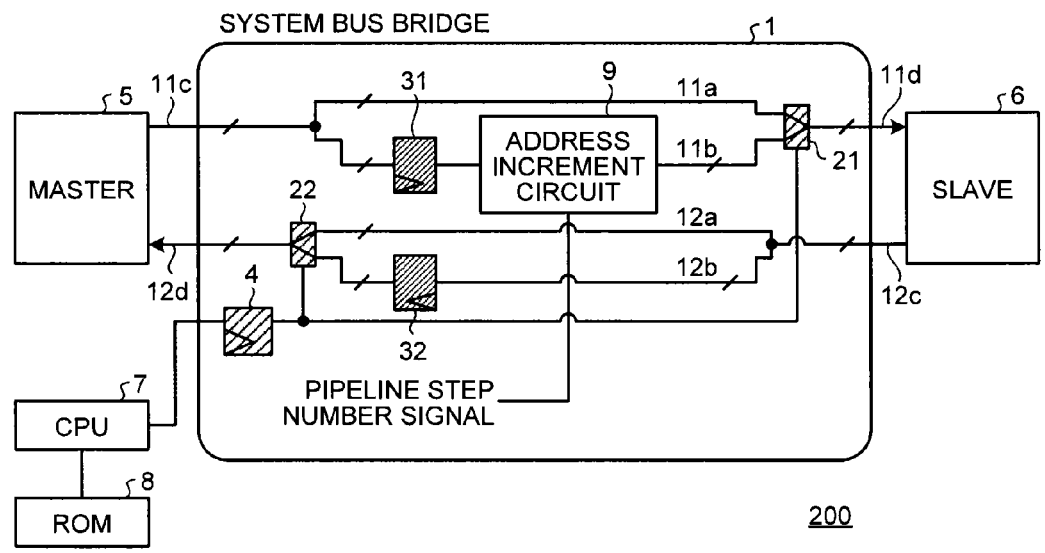
FIG. 12 is a diagram showing a configuration of a semiconductor device of a third embodiment.
Figure 14:
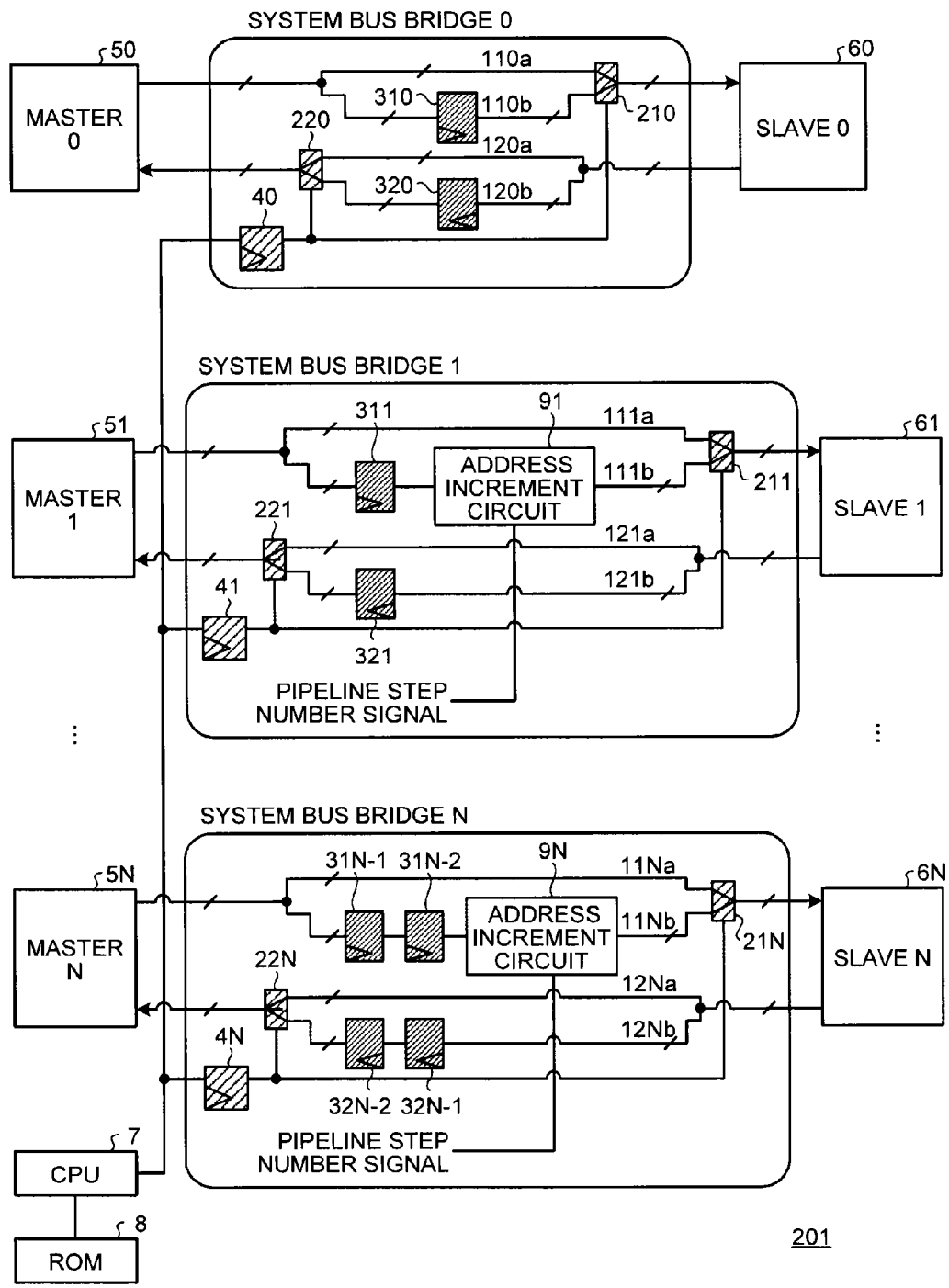
FIG. 14 is a diagram showing another configuration of the semiconductor device of the third embodiment.

Further, the configuration of the semiconductor device 200 shown in FIG. 12 can be expanded to a semiconductor device 201, as shown in FIG. 14, configured of a plurality of sets of masters and slaves including a plurality of masters 50, 51, . . . , 5N and a plurality of slaves 60, 61, . . . , 6N through a plurality of system bus bridge circuits 0, 1, . . . , N. Further, since the system bus bridge circuit N in FIG. 14 has two data retaining circuits 31N-1 and 31N-2, an address increment of an address increment circuit 9N may be worth two addresses, that is twice that of the address increment circuit 9.

Note that, as the set of master 5 and slave 6 as well as the plurality of sets of masters and slaves configured of the plurality of masters 50, 51, . . . , 5N and the plurality of slaves 60, 61, . . . , 6N in the second and third embodiments, any two of the constituent elements connected to the system bus 70 in FIG. 15 may be selected, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
   a first bus circuit that includes:
   a first outbound system bus and a second outbound system bus, the first outbound system bus and the second outbound system bus each having one end connected to a first outbound input terminal,
   a first outbound path switching section that connects another end of either the first outbound system bus or the second outbound system bus to a first outbound output terminal,
   a first inbound system bus and a second inbound system bus, the first inbound system bus and the second inbound system bus each having one end connected to a first inbound input terminal, and
   a first inbound path switching section that connects another end of either the first inbound system bus or the second inbound system bus to a first inbound output terminal;
   a second bus circuit that includes:
   a third outbound system bus and a fourth outbound system bus, the third outbound system bus and the fourth outbound system bus each having one end connected to a second outbound input terminal,
   a second outbound path switching section that connects another end of either the third outbound system bus or the fourth outbound system bus to a second outbound output terminal,
   a third inbound system bus and a fourth inbound system bus, the third inbound system bus and the fourth inbound system bus each having one end connected to a second inbound input terminal, and
   a second inbound path switching section that connects another end of either the third inbound system bus or the fourth inbound system bus to a second inbound output terminal;
   a storing section that stores, as a first setting state, a connecting state of the first outbound system bus or the second outbound system bus, and a connecting state of the first inbound system bus or the second inbound system bus, the storing section storing, as a second setting state, a connecting state of the third outbound system bus or the fourth outbound system bus, and a connecting state of the third inbound system bus or the fourth inbound system bus; and
   a control section that controls, based on the first setting state, the first outbound path switching section and the first inbound path switching section, the control section controlling, based on the second setting state, the second outbound path switching section and the second inbound path switching section.

2. The semiconductor device according to claim 1, further comprising:
   an address increment section that increments an address of an address signal from a first outbound data retaining section arranged on the second outbound system bus.

3. The semiconductor device according to claim 1, wherein the first outbound output terminal is connected to the second outbound input terminal, and
   the first inbound input terminal is connected to the second inbound output terminal.

4. The semiconductor device according to claim 1, further comprising:
   a first master connected to the first outbound input terminal and the first inbound output terminal respectively; and
   a first slave connected to the first outbound output terminal and the first inbound input terminal respectively.

5. The semiconductor device according to claim 1, further comprising:
   a second master connected to the second outbound input terminal and the second inbound output terminal respectively; and
   a second slave connected to the second outbound output terminal and the second inbound input terminal respectively.

6. The semiconductor device according to claim 1, wherein the storing section:
   stores, as the first setting state, one of a first connecting state and a second connecting state, the first connecting state being a state in which the another end of the first outbound system bus is connected to the first outbound output terminal and the another end of the first inbound system bus is connected to the first inbound output terminal, the second connecting state being a state in which the another end of the second outbound system bus is connected to the first outbound output terminal and the another end of the second inbound system bus is connected to the first inbound output terminal, and stores, as the second setting state, one of a third connecting state and a fourth connecting state, the third connecting state being a state in which the another end of the third outbound system bus is connected to the second outbound output terminal and the another end of the third inbound system bus is connected to the second inbound output terminal, the fourth connecting state being a state in which the another end of the fourth outbound system bus is connected to the second outbound output terminal and the another end of the fourth inbound system bus is connected to the second inbound output terminal; and the control section:

controls, based on the first setting state, the first outbound path switching section and the first inbound path switching section so as to assume one of the first connecting state and the second connecting state, and controls, based on the second setting state, the second outbound path switching section and the second inbound path switching section so as to assume one of the third connecting state and the fourth connecting state.

7. The semiconductor device according to claim 1, wherein the first bus circuit further includes:

a first outbound data retaining section arranged on the second outbound system bus, and a first inbound data retaining section arranged on the second inbound system bus; and the second bus circuit further includes:

a second outbound data retaining section arranged on the fourth outbound system bus, and a second inbound data retaining section arranged on the fourth inbound system bus.

8. The semiconductor device according to claim 2, further comprising:

a first master connected to the first outbound input terminal and the first inbound output terminal respectively; and a first slave connected to the first outbound output terminal and the first inbound input terminal respectively.

9. The semiconductor device according to claim 3, further comprising:

a first master connected to the first outbound input terminal and the first inbound output terminal respectively; and a first slave connected to the second outbound output terminal and the second inbound input terminal respectively.

10. The semiconductor device according to claim 4, wherein the first master and the first slave are two components selected from among the storing section, the control section, a NAND controller, a DRAM controller, and a SATA controller.

11. The semiconductor device according to claim 9, wherein the first master and the first slave are two components selected from among the storing section, the control section, a NAND controller, a DRAM controller, and a SATA controller.

12. A semiconductor device comprising:

a first bus circuit that includes:

a first outbound system bus and a second outbound system bus, the first outbound system bus and the second outbound system bus each having one end connected to a first outbound input terminal, a first outbound path switching section that connects another end of either the first outbound system bus or the second outbound system bus to a first outbound output terminal, a first inbound system bus and a second inbound system bus, the first inbound system bus and the second inbound system bus each having one end connected to a first inbound input terminal, and a first inbound path switching section that connects another end of either the first inbound system bus or the second inbound system bus to a first inbound output terminal;

a storing section that stores, as a first setting state, a connecting state of the first outbound system bus or the second outbound system bus, and a connecting state of the first inbound system bus or the second inbound system bus; and a control section that controls, based on the first setting state, the first outbound path switching section and the first inbound path switching section.

13. The semiconductor device according to claim 12, further comprising:

an address increment section that increments an address of an address signal from a second outbound data retaining section arranged on the second outbound system bus.

14. The semiconductor device according to claim 12, further comprising:

a first master connected to the first outbound input terminal and the first inbound output terminal respectively; and a first slave connected to the first outbound output terminal and the first inbound input terminal respectively.

15. The semiconductor device according to claim 12, wherein the storing section stores, as the first setting state, one of a first connecting state and a second connecting state, the first connecting state being a state in which the another end of the first outbound system bus is connected to the first outbound output terminal and the another end of the first inbound system bus is connected to the first inbound output terminal, the second connecting state being a state in which the another end of the second outbound system bus is connected to the first outbound output terminal and the another end of the second inbound system bus is connected to the first inbound output terminal, and the control section controls, based on the first setting state, the first outbound path switching section and the first inbound path switching section so as to assume one of the first connecting state and the second connecting state.

16. The semiconductor device according to claim 12, wherein the first bus circuit further includes:

a first outbound data retaining section and a second outbound data retaining section arranged on the second outbound system bus, and a first inbound data retaining section and a second inbound data retaining section arranged on the second inbound system bus.

17. The semiconductor device according to claim 13, further comprising:

a first master connected to the first outbound input terminal and the first inbound output terminal respectively; and a first slave connected to the first outbound output terminal and the first inbound input terminal respectively.

18. A method of controlling a semiconductor device including
a first bus circuit that includes:
a first outbound system bus and a second outbound system bus, the first outbound system bus and the second outbound system bus each having one end connected to a first outbound input terminal,
a first outbound path switching section that connects another end of either the first outbound system bus or the second outbound system bus to a first outbound output terminal,
a first inbound system bus and a second inbound system bus, the first inbound system bus and the second inbound system bus each having one end connected to a first inbound input terminal,
a first inbound path switching section that connects another end of either the first inbound system bus or the second inbound system bus to a first inbound output terminal;
a second bus circuit that includes:
a third outbound system bus and a fourth outbound system bus, the third outbound system bus and the fourth outbound system bus each having one end connected to a second outbound input terminal,
a second outbound path switching section that connects another end of either the third outbound system bus or the fourth outbound system bus to a second outbound output terminal,
a third inbound system bus and a fourth inbound system bus, the third inbound system bus and the fourth inbound system bus each having one end connected to a second inbound input terminal, and
a second inbound path switching section that connects another end of either the third inbound system bus or the fourth inbound system bus to a second inbound output terminal; and
a storing section that stores, as a first setting state, a connecting state of the first outbound system bus or the second outbound system bus, and a connecting state of the first inbound system bus or the second inbound system bus, the storing section storing, as a second setting state, a connecting state of the third outbound system bus or the fourth outbound system bus, and a connecting state of the third inbound system bus or the further inbound system bus, the method comprising:
controlling, based on the first setting state, the first outbound path switching section and the first inbound path switching section, and controlling, based on the second setting state, the second outbound path switching section and the second inbound path switching section.

19. The method of controlling the semiconductor device according to claim 18, wherein
the semiconductor device further includes an address increment section that increments an address of an address signal from a first outbound data retaining section arranged on the second outbound system bus.

20. The method of controlling the semiconductor device according to claim 18, wherein
the first bus circuit further includes:
a first outbound data retaining section arranged on the second outbound system bus, and
a first inbound data retaining section arranged on the second inbound system bus; and
the second bus circuit further includes:
a second outbound data retaining section arranged on the fourth outbound system bus, and
a second inbound data retaining section arranged on the fourth inbound system bus.

21. A method of controlling a semiconductor device including
a first bus circuit that includes:
a first outbound system bus and a second outbound system bus, the first outbound system bus and the second outbound system bus each having one end connected to a first outbound input terminal,
a first outbound path switching section that connects another end of either the first outbound system bus or the second outbound system bus to a first outbound output terminal,
a first inbound system bus and a second inbound system bus, the first inbound system bus and the second inbound system bus each having one end connected to a first inbound input terminal, and
a first inbound path switching section that connects another end of either the first inbound system bus or the second inbound system bus to a first inbound output terminal; and
a storing section that stores, as a first setting state, a connecting state of the first outbound system bus or the second outbound system bus, and a connecting state of the first inbound system bus or the second inbound system bus, the method comprising:
controlling, based on the first setting state, the first outbound path switching section and the first inbound path switching section.

22. The method of controlling the semiconductor device according to claim 21, wherein
the first bus circuit further includes:
a first outbound data retaining section and a second outbound data retaining section arranged on the second outbound system bus, and
a first inbound data retaining section and a second inbound data retaining section arranged on the second inbound system bus.

23. A semiconductor device comprising:
a first outbound input terminal connected to a first outbound bus and a second outbound bus;
a first outbound switch connected to either the first outbound bus or the second outbound bus to a first outbound output terminal;
a first inbound input terminal connected to a first inbound bus and a second inbound bus;
a first inbound switch connected either to the first inbound bus or the second inbound bus to a first inbound output terminal;
a second outbound input terminal connected to a third outbound bus and a fourth outbound bus;
a second outbound switch connected to either the third outbound bus or the fourth outbound bus to a second outbound output terminal;
a second inbound input terminal connected to a third inbound bus and a fourth inbound bus;
a second inbound switch connected to either the third inbound bus or the fourth inbound bus to a second inbound output terminal; and
a controller that controls the first outbound switch, the first inbound switch, the second outbound switch, or the second inbound switch based on a connecting state of the first outbound output terminal, a connecting state of the first inbound output terminal, a connecting state of the second outbound output terminal, or a connecting state of the second inbound output terminal.

* * * * *